(12) United States Patent
Gold et al.

(10) Patent No.: US 7,316,001 B2
(45) Date of Patent: Jan. 1, 2008

(54) OBJECT PROCESS GRAPH SYSTEM

(75) Inventors: Steven Allen Gold, Madison, CT (US); David Marvin Baker, Branford, CT (US); Vladimir Gusev, Guilford, CT (US); Hongping Liang, Woodbridge, CT (US)

(73) Assignee: Graphlogic Inc., Branford, CT (US)

( * ) Notice: Subject to any disclaimer, the term of this patent is extended or adjusted under 35 U.S.C. 154(b) by 0 days.

(21) Appl. No.: 10/908,654

(22) Filed: May 20, 2005

(65) Prior Publication Data

US 2005/0273773 A1    Dec. 8, 2005

Related U.S. Application Data

(60) Provisional application No. 60/577,501, filed on Jun. 5, 2004.

(51) Int. Cl.
*G06F 9/44* (2006.01)
*G06F 7/00* (2006.01)
*G06F 3/00* (2006.01)

(52) U.S. Cl. ............... 717/108; 717/109; 707/103 R; 715/763

(58) Field of Classification Search ............ None
See application file for complete search history.

(56) References Cited

U.S. PATENT DOCUMENTS

| | | | | |
|---|---|---|---|---|
| 5,295,256 | A | | 3/1994 | Bapat ........................ 395/500 |
| 5,504,917 | A | * | 4/1996 | Austin ....................... 345/522 |
| 5,768,586 | A | * | 6/1998 | Zweben et al. ............. 713/100 |
| 5,801,687 | A | * | 9/1998 | Peterson et al. .......... 715/500.1 |
| 6,163,776 | A | | 12/2000 | Periwal ........................ 707/4 |
| 6,292,803 | B1 | | 9/2001 | Richardson et al. ........ 707/102 |
| 6,314,559 | B1 | | 11/2001 | Sollich | |

(Continued)

FOREIGN PATENT DOCUMENTS

CA    2 256 931 A1    6/2000

(Continued)

OTHER PUBLICATIONS

Arefi et al., "The Object-Oriented Design of a Visual Syntax-Directed Editor Generator", COMPSAC 89, Sep. 20-22, 1989, pp. 389-396.*

(Continued)

*Primary Examiner*—Wei Zhen
*Assistant Examiner*—Chih-Ching Chow
(74) *Attorney, Agent, or Firm*—Cantor Colburn LLP

(57) ABSTRACT

A software system is provided including an Object Process Graph for defining applications and a Dynamic Graph Interpreter that interprets Object Process Graphs. An Object Process Graph defines all of an application's manipulations and processing steps and all of the application's data. An Object Process Graph is dynamic, making it possible to change any aspect of an application's data entry, processing or information display at any time. When an Object Process Graph is interpreted, it functions to accept data, process the data and produce information output. Modifications made to an Object Process Graph while it is being interpreted take affect immediately and can be saved. Object Process Graphs and Dynamic Graph Interpreters can be deployed on single user workstation computers or on distributed processing environments where central servers store Object Process Graphs and run Dynamic Graph Interpreters, and workstation computers access the servers via the intranet or local intranets.

47 Claims, 20 Drawing Sheets

U.S. PATENT DOCUMENTS

| | | | |
|---|---|---|---|
| 6,425,016 | B1 | 7/2002 | Banavar et al. |
| 6,449,657 | B2 | 9/2002 | Stanbach, Jr. et al. ...... 709/245 |
| 6,477,439 | B1 | 11/2002 | Bernaden et al. |
| 6,701,513 | B1 | 3/2004 | Bailey |
| 6,708,179 | B1 | 3/2004 | Arora .......................... 707/102 |
| 6,988,270 | B2 | 1/2006 | Banavar et al. |
| 7,000,190 | B2 * | 2/2006 | Kudukoli et al. ........... 715/763 |
| 7,076,740 | B2 | 7/2006 | Santori et al. |
| 2001/0018690 | A1 | 8/2001 | Ng et al. .................... 707/103 |
| 2002/0184610 | A1 | 12/2002 | Cong et al. |
| 2002/0194155 | A1 | 12/2002 | Aldridge et al. ................ 707/1 |
| 2003/0172091 | A1 | 9/2003 | Norcott ....................... 707/203 |
| 2004/0025171 | A1 | 2/2004 | Barinov et al. |
| 2004/0181544 | A1 | 9/2004 | Anderson ................... 707/102 |
| 2005/0273773 | A1 | 12/2005 | Gold, et al. |
| 2006/0059461 | A1 * | 3/2006 | Baker et al. ................. 717/113 |

FOREIGN PATENT DOCUMENTS

WO        WO 01/25915 A1     4/2001

OTHER PUBLICATIONS

Zhang et al., "Design, Construction, and Application of a Generic Visual Lanuage Genration Environment", IEEE Transactions on Software Engineering, vol. 27, No. 4, Apr. 2001, pp. 289-307.*

Smith et al., "Impulse-86: a substrate for object-oriented interface design", Conference on Object Oriented Programming Systems Languages and Applications, Conference proceedings on Object-oriented programming systems, languages and applications; pp. 167-176, 1986.*

PCT Search Report PCT/US2005/022192 mailed Nov. 11, 2005.

D. J. Anderson; "Using MVC Pattern in Web Interactions;" [online]; [retrieved on Jul. 22, 2000]; retrieved from the Internet at http://www.uidesign.net/articles/papers/.

"Struts User's Guide;" [online]; [retrieved on Jul. 25, 2001].

J. Rumbaugh; "State Trees as Structured Finite State Machines for User Interfaces;" Procedings of the ACM Siggraph Symposium on User Interface Software, 1998; pp. 15-29.

PCT Search Report PCT/US2005/021440.

PCT Search Report for PCT/US2005/018942.

David J. Anderson; "Using MCV Pattern in Web Interactions;" Internet Article Jul. 22, 2000, pp. 1-22.

"Strut's User's Guide;" Internet Article Jul. 25, 2001 pp. 1-5.

C. Russel; "Java Data Objects, JSR 12, Version 1.0.1;" Internet Article May 31, 2003, pp. 1-61.

A. Herbert et al.; "A Graphical Specification System for User-Interface Design;" IEEE Software vol. 7 Jul. 1990, No. 4.

Koo, Hsueh-Yung Benjamin, "A Meta-Language for Systems Architecting", Massachusetts Institute Of Technology, Jan. 2005, 168 pgs.

Borland Software Corporation, "User Guide for Together ControlCenter and Together Solo", Updated Mar. 24, 2004. XP-002374484. Large Document. PDF Split Into Multiple Parts.

Eisenbarth, Thomas, et al. "Static Trace Extraction", Proceedings of the Ninth Working Conference on Reverse Engineering . University of Stuttgart, Germany. IEEE Compute Society. WCRE 2002.

PCT Search Report PCT/US2005/032114. Date of Mailing: Apr. 19, 2006.

Borger, Egon, et al. "Modeling the Meaning of Transitions from and to Concurrent States in UML State Machines", p. 1086-1091, ACM Feb. 2, 2003 1-58113-624, retrieved Aug. 3, 2006.

Knight, Alan et al. "Objects and the Web", p. 51-59, Mar./Apr. 2002 IEEE, retrieved Aug. 2, 2006. Focus Engineering Software, 07-7459/02.

Liu, Chung-Shyan. "An Object-Based Approach to Protocol Software Implementation", p. 307-316, 1994 ACM, retrieved Aug. 2, 2006. Department of Information and Computer Engineering, Chun Yuan C. University.

Wasserman, Anthony I., et al. "A Graphical, Extensible Integrated Environment for Software Development", p. 131-142, 1986 ACM 0-89791-212-8/86/0012/131, retrieved Aug. 2, 2006. Interactive Development Environments, Inc.

* cited by examiner

FIG. 1 – Invention Overview
An Object Process Graph based Computer Application

Composite Layered Graph

Object Process Graph
Type Hierarchy

Object Process Graph
TemplateDatabase Types/Properties

Object Process Graph
Process Nodes

FIG. 6
Object Process Graph
Edge Types
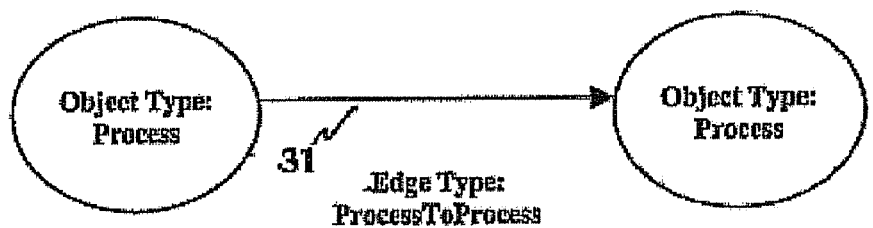
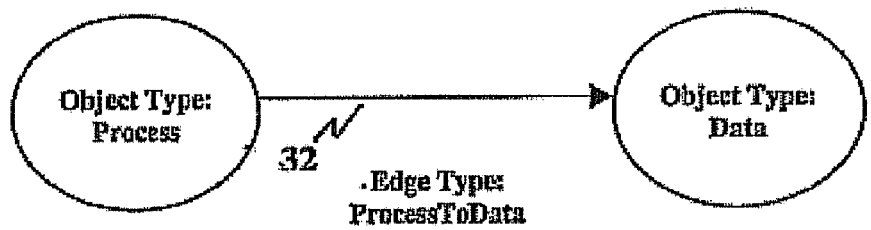
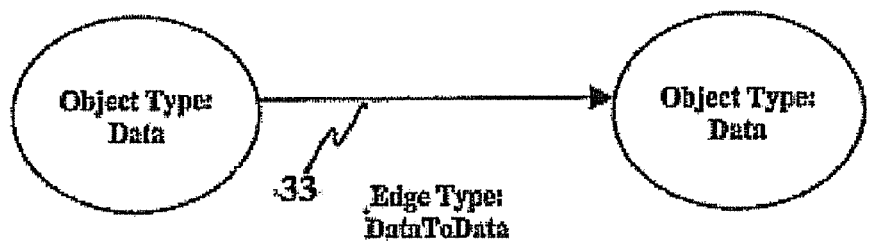

FIG. 7
Object Process Graph
ProcessToProcess Types
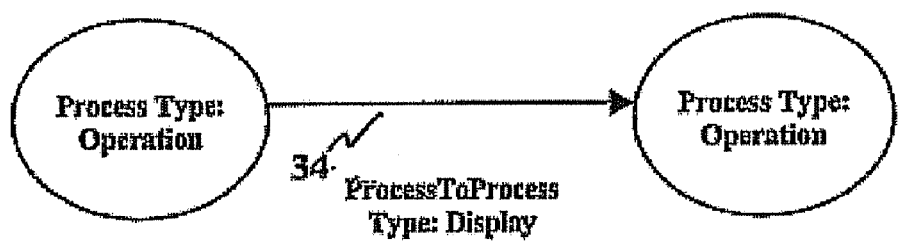
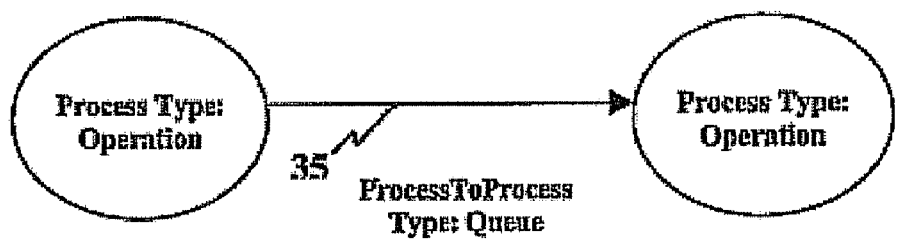
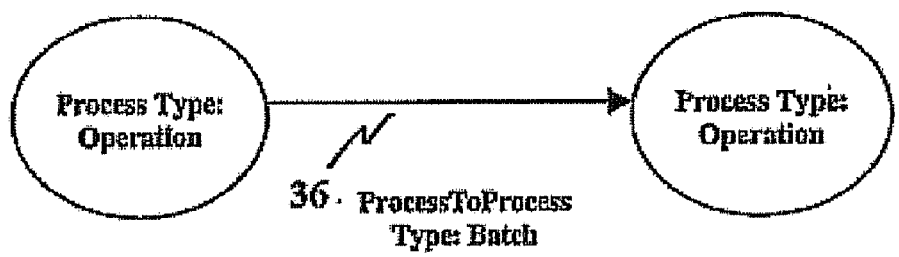

FIG. 9
Object Process Graph
ProcessToData Types
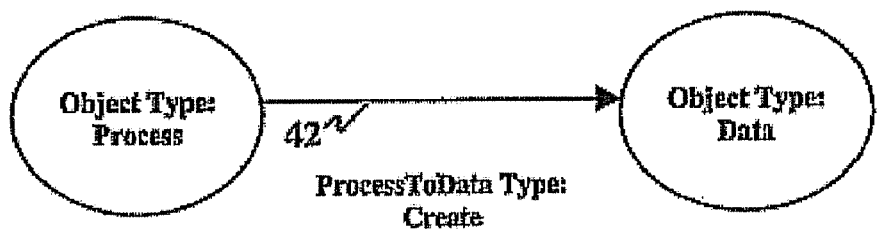
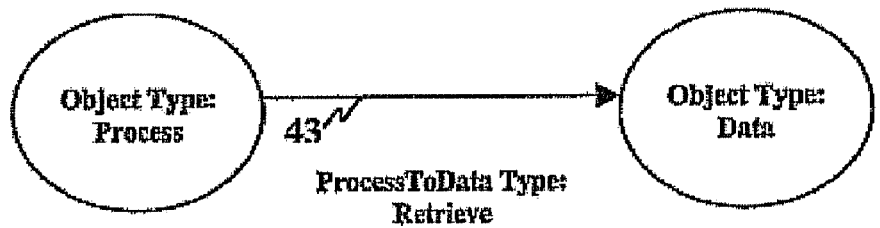
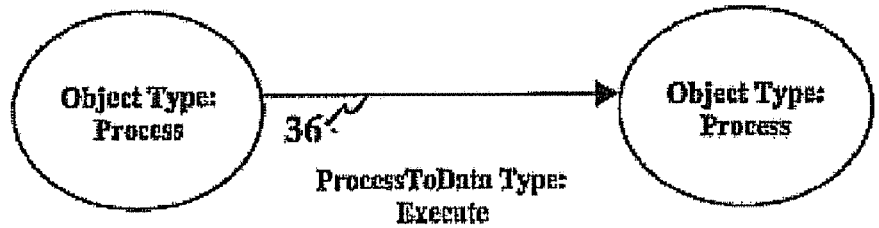

Object Process Graph
User Objects

Object Process Graph
Audit Objects

Dynamic Graph Interpreter

An Application State Node

Dynamic Graph Interpreter
Running an Application Instance

Displaying an Application State

Changing an Application State

Changing an Application State Process and Data Definitions

Changing an Application State

Changing an Application State
And Adding a Data Definition Node

Changing an Application State
Process and Data Definitions

OBJECT PROCESS GRAPH SYSTEM

CROSS REFERENCE TO RELATED APPLICATIONS

The present application claims the benefit of provisional application No. 60/577,501 filed Jun. 5, 2004, the content of which is hereby incorporated by reference in its entirety.

BACKGROUND OF THE INVENTION

The present invention relates to software development tools including programming languages, CASE tools, database systems and interface and display languages and associated tools.

BACKGROUND

Since the development of assembly language in the 1950's, the computer industry has witnessed a series of incremental advances in software development. These advances have allowed software to be developed faster, with less manual labor, and made possible the creation of more complex software systems and improved the reliability of software systems in general. These advances include the development of 3rd generation programming languages like COBOL and Fortran; 4th generation programming languages like FOCUS; object oriented programming languages like Smalltalk, C++ and Java; CASE tools like Rational Rose; visual programming environments like Visual Basic and Web Sphere; relational database systems like Oracle and DB2 and object oriented database systems like GemStone and Versant. However, despite these advances the development of large systems is still an expensive, high-risk venture that requires many, highly-skilled programmers and there is always considerable uncertainty regarding the quality and applicability of the final system.

A major constraint on the implementation of software systems with current methods is the need for detailed, fixed requirements laid out in advance of the development cycle. A means of implementing complex systems that are easily and reliably modified on the fly, so they can be adapted to changing requirements as they arise, would greatly broaden the scope, applicability, and usefulness of computer applications.

BRIEF SUMMARY OF THE INVENTION

The present invention defines and implements object process graph systems.

One aspect is an object process graph system, including a graph structure and a graph interpreter. The graph structure is dynamic, directed and cyclical and defines an application. The graph structure has at least one data node, at least one process node, and at least one application state node. The graph interpreter interprets the graph structure to process the application. The graph structure may be changed, while the graph structure is being interpreted by the graph interpreter.

Another aspect is an object process graph system, including a graph structure, a graph interpreter, and a graph user interface. The graph structure defines an application. The graph structure is a composite layered graph and includes a plurality of nodes. The interpreter interprets the graph structure to process the application. The graph user interface displays graph structures on display media and processes user defined changes to graphs entered by input devices. The graph structure may be changed, while the graph structure is being interpreted by the interpreter.

Exemplary embodiments of the present invention include many advantages, including reducing the costs and risks involved in building large, complex software systems. Application users and application domain experts are able, with minimal computer training, to develop and maintain customized, complex software systems. It is possible to create applications that can be modified at run-time in order to greatly broaden the scope, flexibility and usefulness of software application systems.

BRIEF DESCRIPTION OF THE SEVERAL VIEWS OF THE DRAWINGS

These and other features, aspects, and advantages of the present invention will become better understood with regard to the following description, appended claims, and accompanying drawings, where:

FIG. 6 is Object Process Graph Edge Types according to embodiments of the present invention;

FIG. 7 is Object Process Graph ProcessToProcess Types according to embodiments of the present invention;

FIG. 9 is Object Process Graph ProcessToData Types according to embodiments of the present invention;

DETAILED DESCRIPTION OF THE INVENTION

Figure 1:
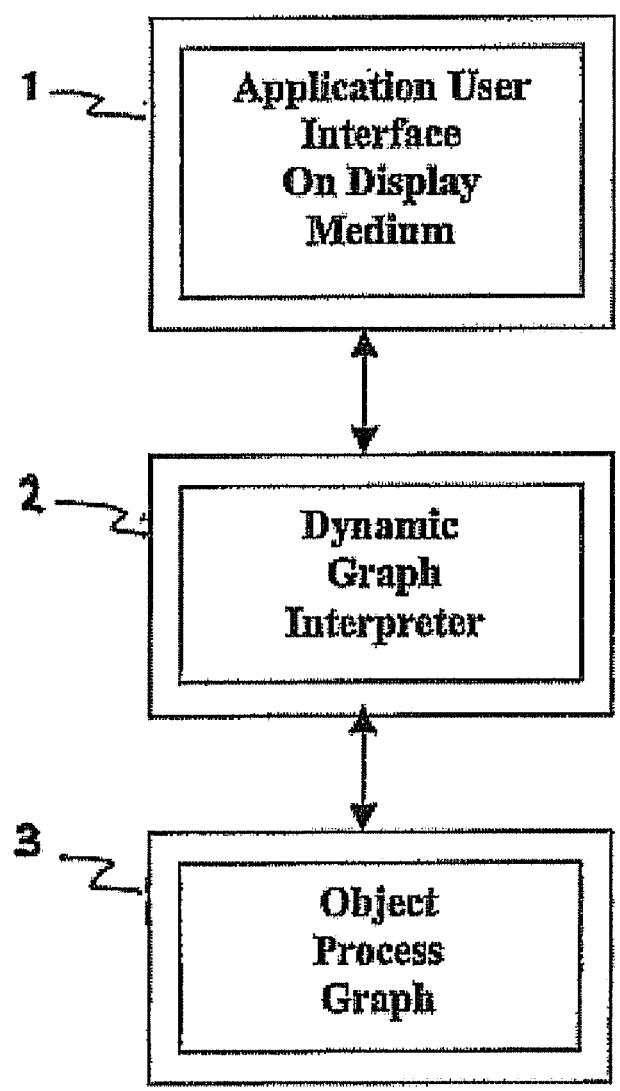
FIG. 1 is an Object Process Graph based computer application according to embodiments of the present invention.

Aspects of the present invention include an Object Process Graph (OPG) and a Dynamic Graph Interpreter (DGI). An OPG defines a computer application's persistent and transient data, its processing logic and data flow, and the display and validation characteristics of every application data item. A graphical user interface based editing system can be used to create and modify OPG's. The DGI is an object-oriented system that accesses, interprets, modifies and acts on an application's dynamic OPG. Interpreting an OPG is similar to running an application in a traditional computer environment.

Embodiments of the OPG may be considered a computer language (it is Turing complete) that is interpreted as the program is executed. An OPG is stored in transient and persistent computer memory. An OPG can hold any data structure, which includes, but is not limited to: relational tables, hierarchical tables, n-dimensional data arrays, spreadsheets, graphical models and 3-D physical models. These data structures are not stored as blobs, which is common in relational database systems, but in special OPG structures that reflect their original structure and internal relationships. OPG process and control structures provide control over the order and timing of persistent and transient data validation, transformation and display within an application. OPG structures can also define mathematical formulas, regular expressions (in the case of textual data or mixed quantitative and textual data) and complete algorithms.

An application's OPG can be rendered on a computer terminal or static output medium, e.g. paper. OPG data, process and control structures displayed on an interactive medium can be edited. Unlike traditional software development systems, editing an application's OPG does not generate code that must be compiled and installed. Instead, changes are made and take affect immediately. Changes can even be made while the DGI is interpreting (running the application). The ability to safely change an application at any time is desired for rapid development and the long-term maintenance of large, complex enterprise-wide application systems.

All application execution state information in an OPG is held in Application State objects. The DGI acts on the OPG by changing the application state information it holds. Application state information can include any persistent data object. A DGI may operate on multiple application states concurrently, merging or splitting state information between combinations of application state objects.

An OPG maintains audit trail information for all persistent and transient data changes in an application—at the primitive data level. Audit trail information is readily available for display on a user interface, via display controls or for further update and manipulation in an application's process and data flows.

Audit information defining changes made in long and short transactions is maintained and tracked for all changes to the persistent data of an application. Long transactions enable the system to organize, control and track changes to all persistent data. Such changes can take place over an extended period of time (days or weeks) over many work sessions. Short transactions, on the other hand, are made during a single user session or interaction with the system. Long and short transaction information is immediately available for manipulation and display within the application, via a system's graphical user interfaces. Tracking long transactions also facilitates rollbacks to any point in a transaction and deletions of a transaction (with audit trails) are automatically available via the application interface. Control of access to all functionality and data within the application by users is available through the system interface. This includes separate access rights (read, write, rollback) for each primitive data item defined as part of an application for each user.

In addition to data entered or changed via a user interface, an embodiment of the system also accepts input data to application processes in any digital format from other systems.

Some embodiments include a graphical user interface. A graphical user interface can enable a user to specify the format of all input that is then automatically parsed and used to update an application—adding to or modifying persistent data in the database or transient data in the application or display interfaces—at any point in the application process.

Output data may likewise be created in any format from any point in an application (for persistent or transient data), using the inverse of the above process in various embodiments. In some embodiments, external databases, such as relational databases, may be registered with an application, and all persistent data within the application may be stored in or retrieved from such databases.

Embodiments of the Object Process Graph component of the present invention extend the basic functionality of traditional graph object-oriented databases. Embodiments of the present invention synthesize the functionality of dynamic process elements and graph object oriented databases into a single integrated system, which makes it possible to rapidly create complete, complex enterprise wide applications without a traditional programming language. An OPG is directly and dynamically interpreted, therefore no code generation is required. The ease of changing an OPG and the immediate feedback resulting from changes greatly simplifies maintaining and changing OPG based applications.

Embodiments of the present invention include two components (FIG. 1): a dynamic, composite layered Object Process Graph (OPG) 3 and a Dynamic Graph Interpreter (DGI) 2. An OPG 3 completely defines and represents an application. The DGI 2 translates and interprets the OPG 3 of the application as the application is run. The application's interface 1 interacts with the DGI 2, updating persistent data stored in the OPG 3 or transient data controlled by the OPG 3 as the application runs.

Object Process Graph

In an exemplary embodiment of the present invention, the OPG 3 is structured as a composite layered graph (FIG. 2), with two node types—composite and primitive. Dark colored nodes in FIGS. 2-8, 9, 10, and 12—are not composed of other nodes and are, therefore of node type primitive. Unfilled nodes in these figures are of node type composite. The OPG composite layered graph includes a set of directed graphs and a set of trees. Each node within the graph belongs to both a directed graph and a tree. The directed graph to which each node belongs defines its relationships with other nodes within that graph. The tree to which the node belongs defines the composition hierarchy to which it belongs. A node may belong to multiple directed graphs as well as multiple composition hierarchies. For example, nodes 9, 10, 11, and 12 in FIG. 2 belong to directed graph 7. Nodes 9, 10, 11, and 12 also belong to the same composition hierarchy tree as node 6, which belongs to directed graph 5. Node 6 is the parent of nodes 9, 10, 11, and 12 in the composite hierarchy tree and is of node type composite. Note that the composite layered graph described here is simply a special case of a directed graph, so another embodiment of the OPG 3 could use a directed graph containing parent-of edges to indicate composition. Dark colored nodes in FIGS. 2-8, 9, 10, and 12—are not composed of other nodes and are, therefore of node type primitive.

Figure 3:
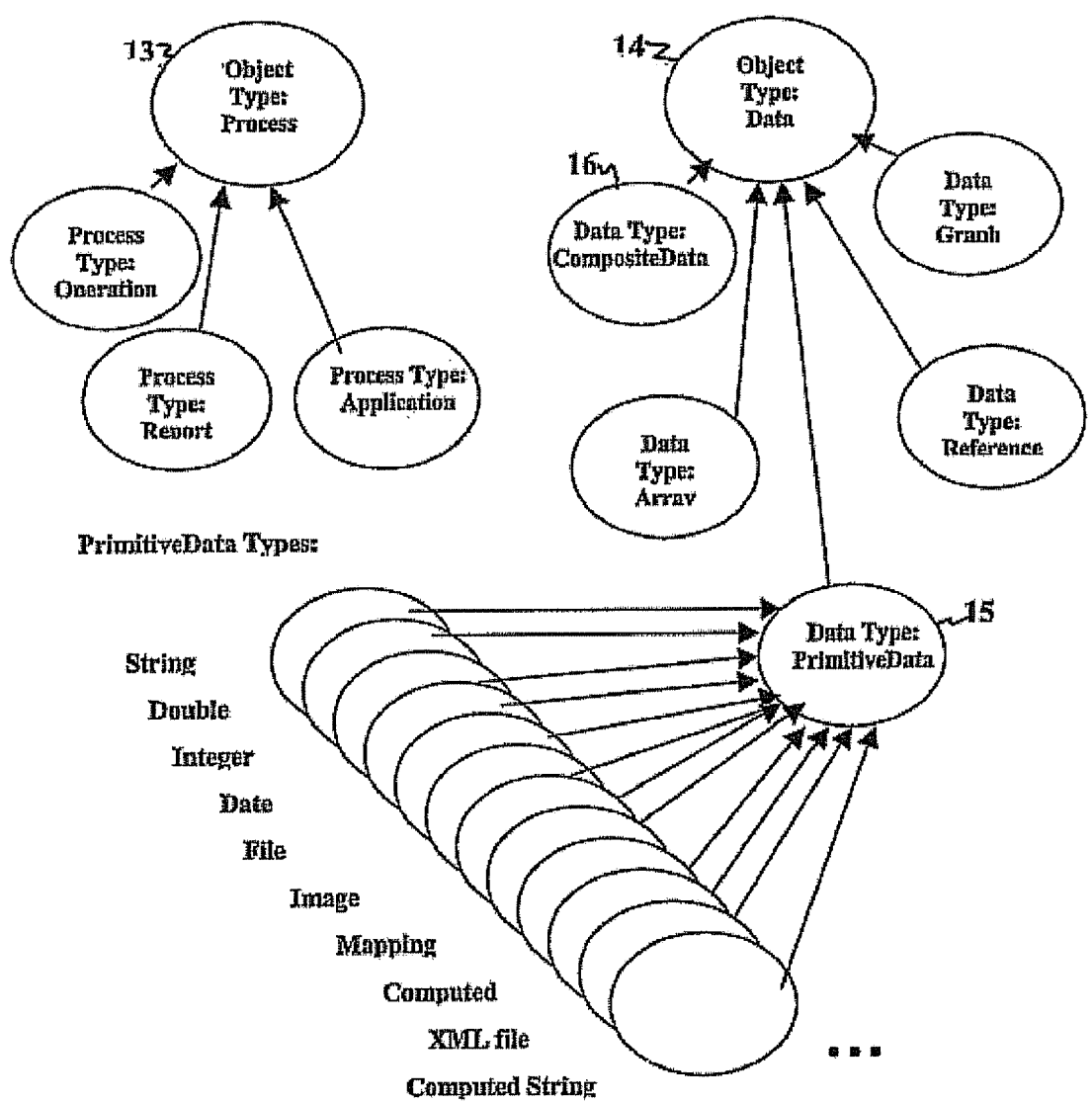
FIG. 3 is an Object Process Graph Type Hierarchy according to embodiments of the present invention.

An OPG 3 includes at least two node object types: process and data. (There are some additional specialized node object types to be described later). As described above, within each node object type the node types may be primitive, having no child in the composite hierarchy tree of which it's a member, or composite. The following description of process and data types is one exemplary embodiment of the present invention (FIG. 3). Process types 13 may be Operation, Report, or Application—all of which can be of node type composite. Operation and report types can also be of node type primitive. Data types 14 can be primitiveData 15, compositeData 16, array, graph, or reference. In this exemplary embodiment, Nodes of data type primitiveData can only be of node type primitive, and nodes of all other data types can only be of node type composite.

In this exemplary embodiment, PrimitiveData nodes 15 can be any one of the primitiveData types. Each primitiveData node's properties are specific to its type. (Note that this is true for all nodes—a node's properties are dependent on its type hierarchy, but nodes may also be graph-definition and/or runtime specific.) A large number of predefined primitiveData types are available in various embodiments of the OPG system, such as: string, double, integer, date, file, image, mapping, XML file, computed, computed string, custom class, email address, web address, directory, spreadsheet cell, file transform, long integer, big decimal, binary, and relational table. Each primitiveData type definition includes specialized functions for processing and displaying its data. For example, the file transform data type allows the display of basic information in the file in multiple formats: text, CVS, XML, spreadsheet (Excel—commercial license dependent), word processing document (Word—commercial license dependent).

Although adding primitiveData type definitions may be a relatively rare occurrence, new code for new primitiveData types can be incorporated in an existing OPG 3 without regeneration, or reorganization of the OPG 3. In Life Science applications, for example, domain-specific primitiveData types that include: sequence, multiple sequence alignment, gel image, and protein structure could also be added. Note also that primitiveData types can contain algorithms or custom classes (program modules) that can be executed within the application.

CompositeData nodes 16 are composite layered graphs of any data type node, i.e. primitiveData, array, graph, reference and compositeData. Array nodes are homogenous, n-dimensional arrays consisting of any data type nodes. Graph nodes are directed graphs consisting of nodes of any data type. Reference nodes are pointers to instances of any data type node.

Each data node has a templateDatabase type (FIG. 4) of either Definition 17 or Instance 18. Definition nodes contain a set of properties that are common to all instance nodes 20 which correspond to that definition node 19. These properties control how the data of an instance node's value, which are a subset of the node's properties, are processed and displayed. For example, display and edit are two properties that indicate how a data value property can be displayed on the display medium or can be edited on the display medium. Display coordinate properties indicate the location on a computer monitor where values can be displayed; other properties indicate font, color, etc. Properties may also include validation criteria, including the use of regular expressions to validate input. Properties can be process-node specific, i.e. each definition node has a default set of properties 21, but for any process node 22 a property can be redefined 23 just for that process node. Any corresponding instance node that exists in an application state of an active process node would use its node properties for that process node. If no process-node specific properties exist for an instance node, the default properties of the corresponding definition node are used. Moreover properties can be application-state-node specific, i.e. property 23a is just defined for application state X 22a. (Application states will be described in more detail below in the description of the DGI 2.) Not only may the properties of a data definition node be process specific or application state specific, but a data definition node itself may be process or application state specific. A data definition node specified in this way will only be applied to a given process or application state (or combinations of process and/or application states) and ignored at all other process steps or application states, in this exemplary embodiment.

Instance data nodes are specific instantiations of data definition nodes. Properties may also be set at the data instance level. Specific data types may have their own set of properties. For example, the file dataType would have file name and path properties, which are instance specific. All data types have at least one value property that is instance specific. For instance specific properties, the definition node can hold default values for each property.

All data nodes have a duration property that is set in the definition node for all instances of that definition node (there can also be a definition duration property that affects the lifetime of the definition node itself). Using this property, transient and persistent instance nodes can be created. Persistent instance nodes are stored in the OPG 3 for extended periods of time, while transient nodes exist only for the lifetime of the current session (or some subset/superset thereof—could be long or short transaction dependent and/or process node dependent). With this mechanism the creation and manipulation of temporary working storage can be controlled by the OPG 3 (as transient instant data), without storing such data permanently in the OPG 3, if so desired by the application user/designer.

Process nodes 24 (FIG. 5) control the flow of instance nodes through an application and the creation, modification and display of instance nodes via the display medium used by the application. Operation nodes 25, which are one type of process node, define discrete steps in the data and process flows through the application, including changes to the display medium of an application.

Application state nodes 26 are of node type composite. They contain logically connected sets of instance nodes 27, which are created, modified or displayed through a subset of operation nodes. Report nodes 28 are specialized operation nodes that do not permit the modification of persistent data in the OPG 3 (except for some specialized report related data nodes). Application nodes 29 are of node type composite. They contain logically connected sets of process and data nodes 30.

All nodes within the OPG 3 are connected by edges that define the relationships between nodes. The relationships may include, but are not limited to: transformational, passive, control passing and relational. Edges have properties, but unlike nodes do not contain other nodes or edges, (though the value of a property could be a node). In one embodiment of the present invention three edge types are defined: processToProcess, processToData, and dataToData (FIG. 6). ProcessToProcess edges 31 define relationships between process nodes, processToData edges 32 define relationships between processes and data nodes and dataToData edges 33 define relationships between data nodes. Within the context of this embodiment, the following paragraphs define concrete instances of these three edge types.

There are three processToProcess edge subtypes: display, queue, and batch (FIG. 7). A display edge 34 between operation or report nodes indicates that process control within the application moves between the nodes—in the direction specified by the edge. An application state within the application at operation A, after execution at operation A, is then displayed on the display medium at operation B. This example defines moving from one screen to another within an application.

A queue edge 35 between operation or report nodes indicates that when process control moves from node A to node B, the application state will be queued up at node B, but not displayed unless the user takes further action via the application interface (such as clicking on a link representing that application state on a list displayed in a representation of node B on the display medium). This example describes a workflow operation within an application.

A batch edge 36 between report and operation nodes results in processing defined by operation B, being invoked as a background process, when application state moves from operation A to operation B within the application. A batch edge is used to schedule a concurrent process node to run in the background based on a scheduleTime property within the edge. Note that all these edges can hold data nodes as properties that can be used to invoke conditional execution of the edges. So a given screen may or may not display in the application based on the results of a comparison between two data nodes.

Figure 8:
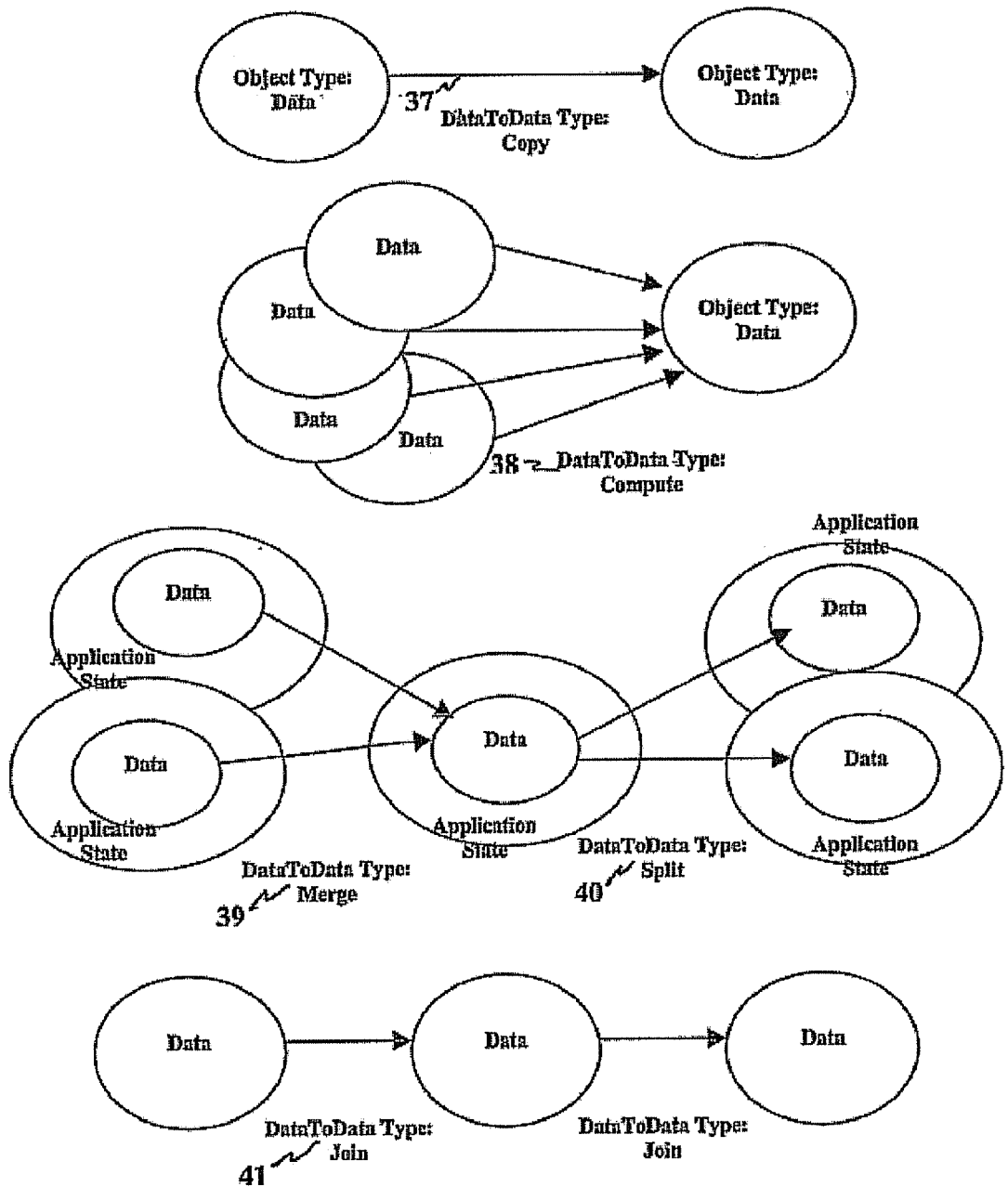
FIG. 8 is OPG Database DataToData Types according to embodiments of the present invention.

There are five dataToData edge subtypes: copy, compute, split, merge, and join (FIG. 8). All dataToData edges are data type and primitiveData type aware. A copy edge 37 between two arrays will copy data elements from one array to another, subject to any mapping property the edge may define. A copy from a primitiveData to an array will copy and repeat the values and some properties of the primitiveData node to all the elements of the array. Appropriate value conversions take place, as needed, between nodes of different primitiveData types (such as string to integer), depending upon the properties of the edge: strongType or weakType. WeakType edges permit such data conversions to take place, while strongType edges prohibit it.

Compute edges 38 provide complex mathematical formula and/or regular expressions to operate on any number of data nodes to compute another data node. Split 39 and merge 40 edges allows application state objects to be split or merged as they move from one operation to another in an application. They allow instance nodes in one application state object to be split into multiple application state objects as they flow from one operation to another, or instances nodes in many application state objects to be merged into one application state object.

Join edges 41 allow compositeData instance nodes based on different definition nodes to be combined and retrieved together from the OPG 3. Reference nodes may be utilized in conjunction with join edges in these cases.

There are three processToData types: create, retrieve, and execute (FIG. 9). Create edges 42 create new instances of a definition node in an application state at a process node. Retrieve edges 43 retrieve data instances and place them within application state objects at a process node. Execute edges 44 will execute program code or control structures (including algorithms) that may be contained within a data node during the logic and control flow of the application at that process.

Note that different embodiments of the present invention may add to or modify the nature of all the edge types and subtypes described above.

Figure 10:
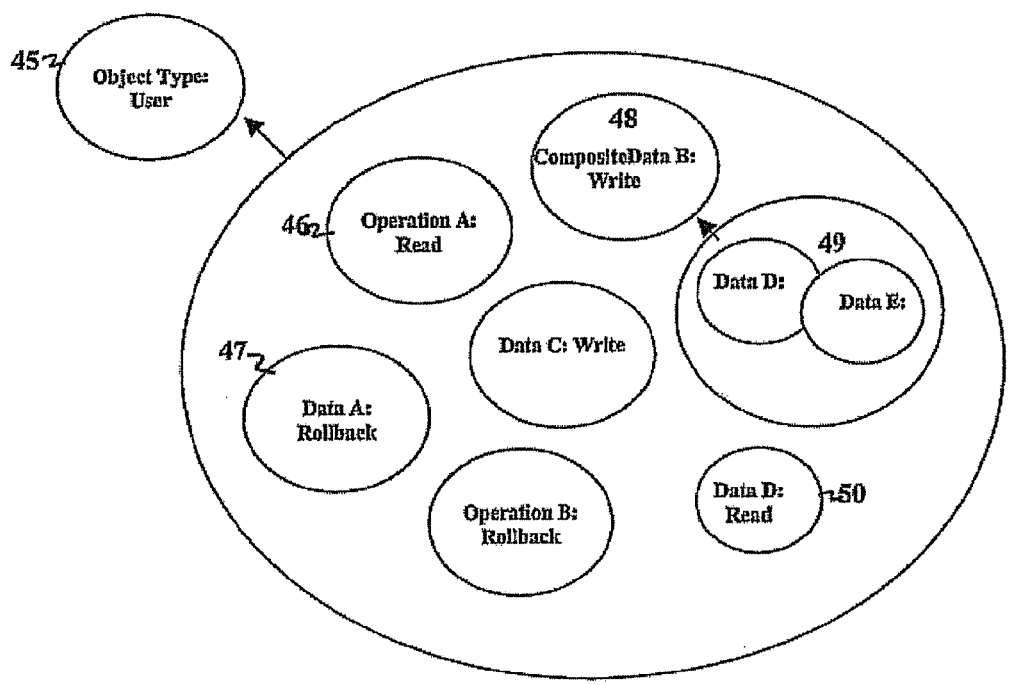
FIG. 10 is Object Process Graph User Objects according to embodiments of the present invention.

In one embodiment of the present invention, a user is represented by a specialized object type that controls access to functionality and data within an application (FIG. 10). A user object 45 is created within the OPG 3 for every individual user who has access to any part of an OPG application. Additional user objects may be created to group sets of functionality or data access in any manner desired. Each user object contains all the process 46 and data 47 objects to which access is permitted within the application. An access right is assigned for each object within a user object, which may be one of the following from either of these two lists: (list1—for data instances) blockI, readI, writeI, rollback, (list2—for data definitions and processes) blockM, readM, writeM. If a user object contains an access right for a composite object 48, the Dynamic Graph Interpreter 2 automatically assigns the same access rights to all the child nodes 49 of the composite object, using its composition tree. However, if the user object also contains one of its child nodes 50 then its access right is used instead for that particular child (in FIG. 10 Data D has only read access instead of the write access of its parent). Note that rights are ordered and inclusive within each list, so rollback rights include readI and writeI access.

Block rights are used to take away all access rights and are only needed when overriding a parent's rights, since the default access right is block—i.e. when an object or any of its parents is not present in a user object. User objects can also inherit all rights from another user object. This permits the set up of any number of group rights or roles—including a hierarchy of such groups or roles—which can be used to update rights automatically to many users simultaneously.

Figure 11:
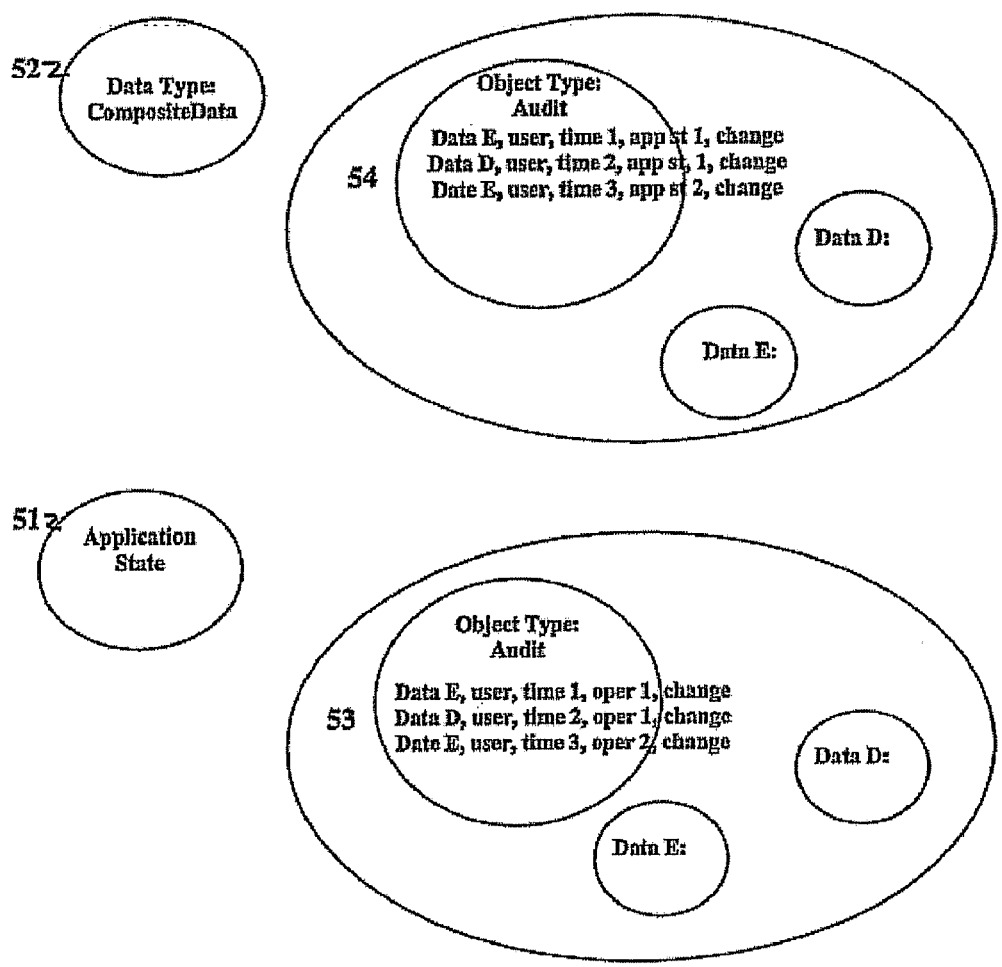
FIG. 11 is Object Process Graph Audit Objects according to embodiments of the present invention.

Audit is another specialized object type. It is used to track all accesses and modification to data within an application (FIG. 11). Residing in both the application state 51 and compositeData 52 objects, they track all accesses and modifications to data by user, time and operation step at both the application state 53 and data instance levels 54. If the audit property is 'on' for all definition data used in an application state, rollbacks of the application state may be performed to any operation step within the transaction. In the case of queued operations (such as in workflows) this permits the rollback of long running transactions that may take place over many user sessions. The DGI 2 checks for post transaction changes to any data and prevents rollbacks in that case (or permits overrides if the appropriate properties are set).

Index objects can be specified within an Object Process Graph 3 to shorten search paths in order to enhance performance.

Dynamic Graph Interpreter

The Dynamic Graph Interpreter (DGI) 2 (FIG. 12) interprets a dynamic OPG 3, and using a display medium 57, it dynamically displays visual aspects of an application. The DGI 2 accesses an application's state nodes 58 and its process and data nodes 59 in concert to run individual instances of an application.

Together, the application state nodes and process and data nodes in the OPG 3, contain all the information needed to both display application information and transition an application instance from one state to another. An application state node (FIG. 13) 60 contains the active, current operation node(s) of an application instance as well as all the data instance nodes associated with the instance at a particular state.

The DGI 2 runs (equivalent to interpreting, executing, performing or running in the traditional sense) an instance of an application (FIG. 14) by making transitions from one application state to another 61 and displaying the application's state information on a display medium 57. Displaying application state information on a display medium allows a user to dynamically interact with the application to effect changes to the application states. It also allows the user to change other elements of the application's OPG 3—such as process nodes, data definition nodes and any edge information between these nodes 62. Changes to these elements of the OPG 3 immediately effect the DGI's 2 interpretation of the OPG 3 and consequently enable an application to dynamically change while it is being interpreted, i.e. run.

Figure 15:
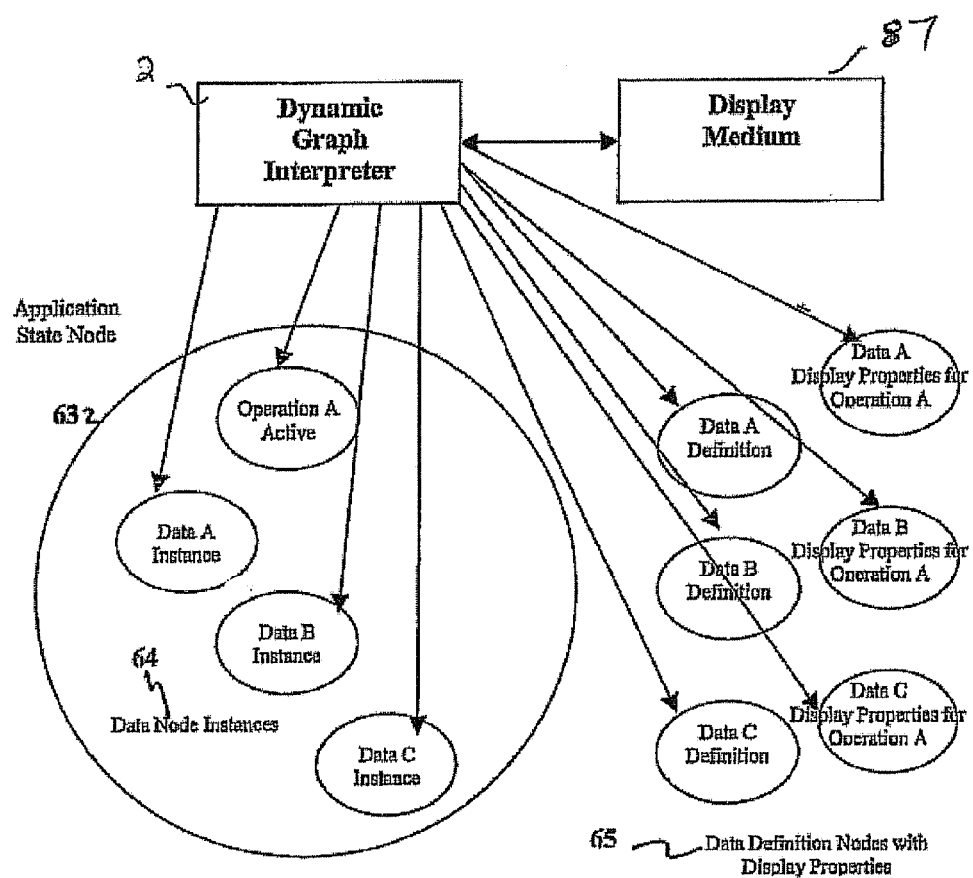
FIG. 15 is Displaying an Application State according to embodiments of the present invention.

The DGI 2 renders an application instance's state information on a display medium 57 according to display properties (FIG. 15). State information is held in data instance nodes. Display properties are either operation-specific data instance display properties or default display properties held in data definition nodes. Operation-specific data-instance-display properties take priority over the default display properties. The DGI 2 examines all the data instance nodes 64 within the application state node 62, finding their corresponding data definition nodes 65 within the OPG 3 and their corresponding display properties in the active operation. If there are no specific display properties for the active operation and data definition node, the default display properties for the data definition node are used. All data instances—with their instance-specific property values are then rendered on the display medium 57 according to their operation-specific display properties. Other display properties specific to the active operation may also be rendered on the display medium.

Figure 16:
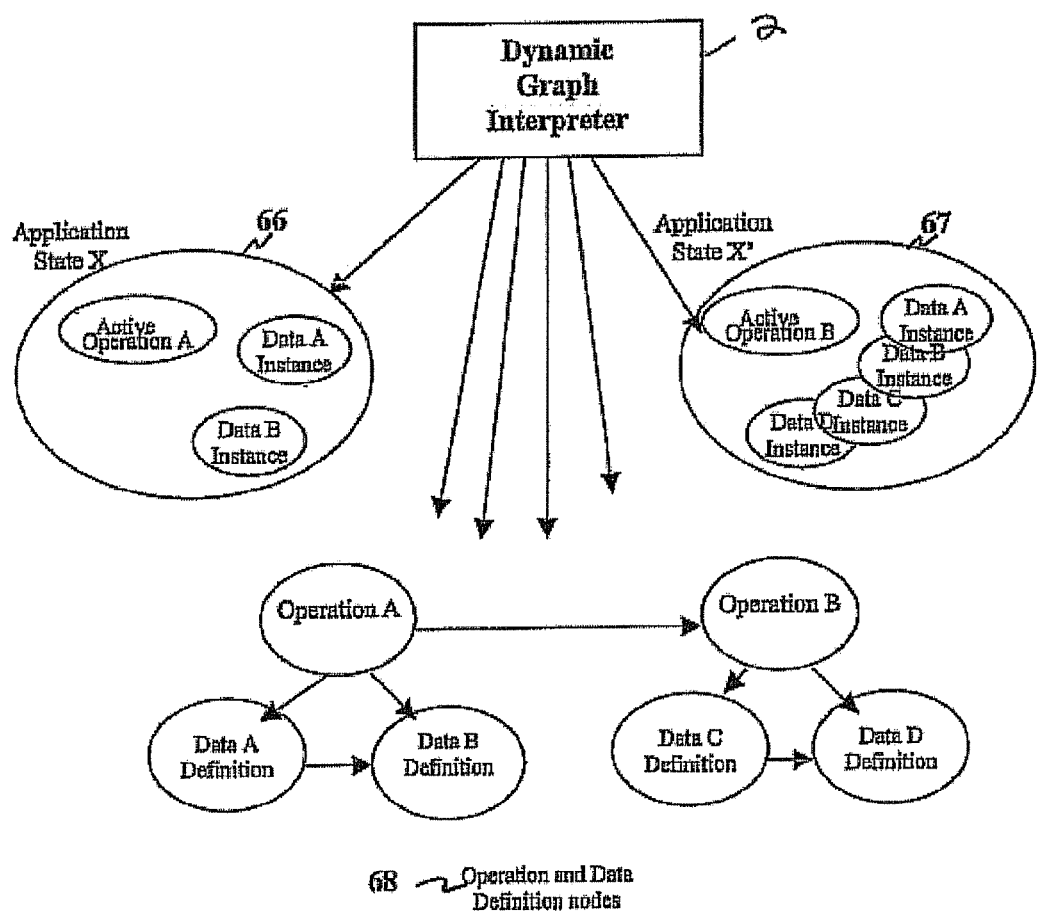
FIG. 16 is Changing an Application State according to embodiments of the present invention.

The DGI 2 changes an application's state (FIG. 16) by first examining the active operation's node(s) within the application state. It then looks at the operation node within the OPG 3, finds the edges leading out from the operation node and executes the transformations indicated by those edges. In addition, it examines the data definition nodes corresponding to the data instances within the application's state node, finds the edges leading out from those data definition nodes and executes the transformations indicated by those edges. So, for example, in FIG. 16, application state X 66 is changed to application state X' 67. The active operation is changed from Operation A to Operation B and two new data instances are added to the application state—Data Instance C and Data Instance D. The transformations required to change X to X' are determined by the corresponding operation and data definition nodes along with their interconnecting edges 68.

Figure 17:
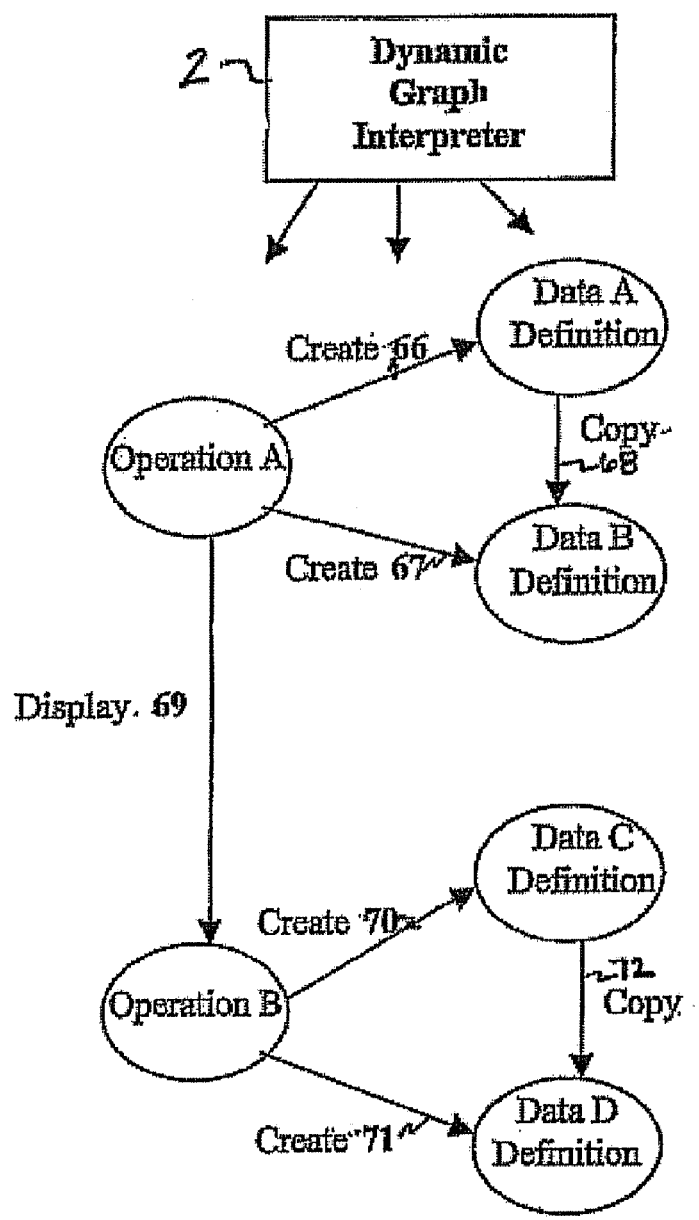
FIG. 17 is Changing an Application State Process and Data Definitions according to embodiments of the present invention.

FIGS. 17-20 describe an example of running one step (equivalent to moving from one active operation to the next active operation) of an application instance in more detail. FIG. 17 describes part of an OPG 3 that details the operation nodes, data definition nodes and edge transformations that will be accessed by the DGI 2 while running the step. FIG. 17 also details the sequence in which the edge transformations will be run; Create 66, Create 67, Copy 68, Display 69, Create 70, Create 71, and Copy 72.

The example (FIG. 18) begins with application state X 73 displayed on the display medium 57. At the stage in which FIG. 18 begins, with application state X 73, as detailed, edge transformations Create 66 and Create 67 from FIG. 17 have already run—however no other edge transformations shown in FIG. 17 have run. As described in FIG. 15 what is displayed on the display medium 57 is controlled by the display properties contained within the data definitions 75 corresponding to the data instances within the application state. The DGI 2 manages a user's 77 interactions with this display medium 57, updating the data instances within the application state according to the user's interactions on the display medium 57. Note that while a user 77 via the DGI 2 can update the properties within data instances in an application state 73, that user 77 can also, at the same time, via the DGI 2, update the properties of the data definitions 75 corresponding to those data instances in the application state 73. Once the user 77 has completed interacting with the application state X 73 via the display medium 57 the DGI 2 will run the Copy 68 (FIG. 17) edge transformation, which together with the updates made by the user 71 through the display medium 57 will result in an updated and transformed application state X' 78 in the OPG 3. The DGI 2 now examines the operation nodes, data definition nodes, and edge transformations 80 in the OPG 3 and runs the Display 69, Create 70 and Create 71 (FIG. 17) edge transformations that results in an updated and transformed application state X" 81. This updated application state X" 81 is in turn interpreted and displayed on the display medium 57 via the DGI 2 in the fashion described in FIG. 15.

Figure 18:
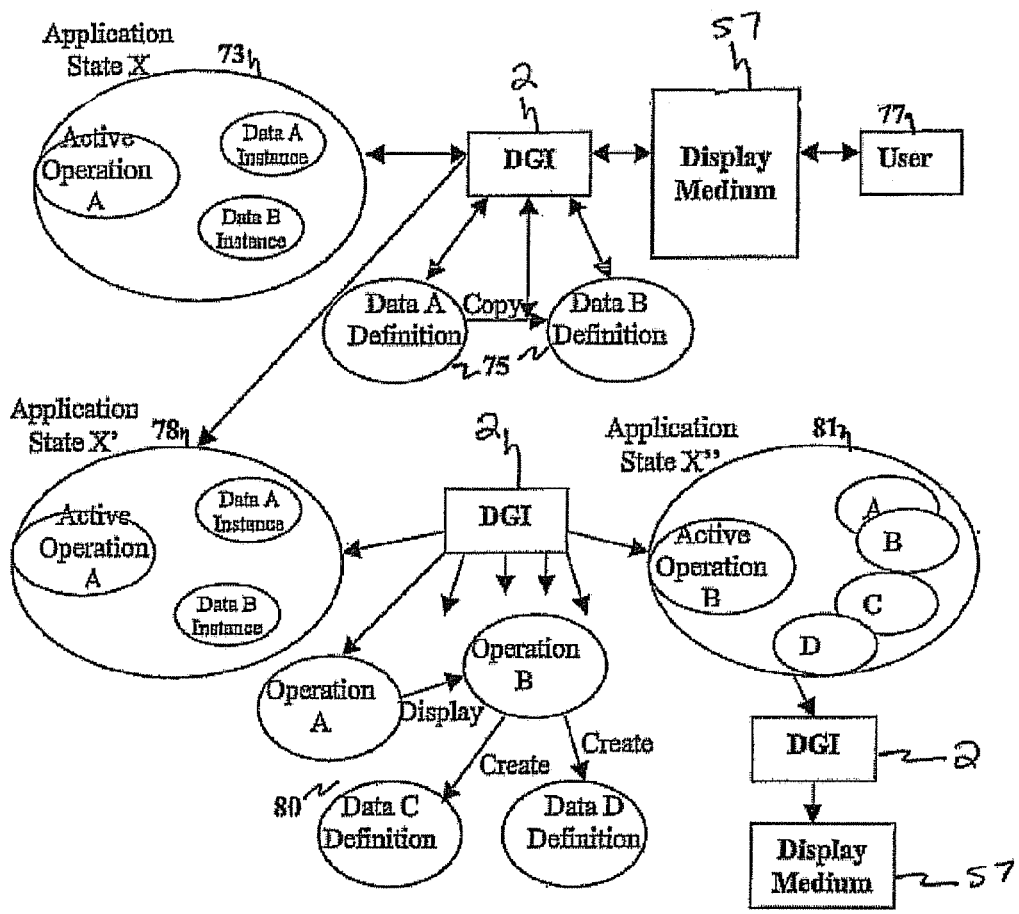
FIG. 18 is Changing an Application State according to embodiments of the present invention.

As stated above and implied in FIG. 18 (see the two-way arrows between the DGI 2 and the data definition nodes 75) the user may concurrently update the data definition nodes while updating the data instance nodes. However, the ability to concurrently update the application definition while running it is not limited to updating existing data definition nodes, but may extend to updating any part of the OPG 3, which completely details all aspects of the application. So in FIG. 19 the user 88 adds via the display medium 57, mediated by the DGI 2, a new data definition node E 86, along with a Create edge 85 to the OPG 3 while simultaneously updating application state X 83.

A new updated and transformed application state X' 89 is produced by the DGI 2. This new application state X' 89 is then likewise updated and transformed by the DGI 2 using processes, data definition nodes and edges 91 within the OPG 3 to control the transformation and update. These data definition nodes and edges may include newly defined nodes and edges, such as 85 and 86. Therefore, in this example, the subsequent application state X" 92 will include a new data instance E, which was defined within this application step. The application state X" 92 is then displayed on the display medium 94 via the DGI 2 as before.

Figure 19:
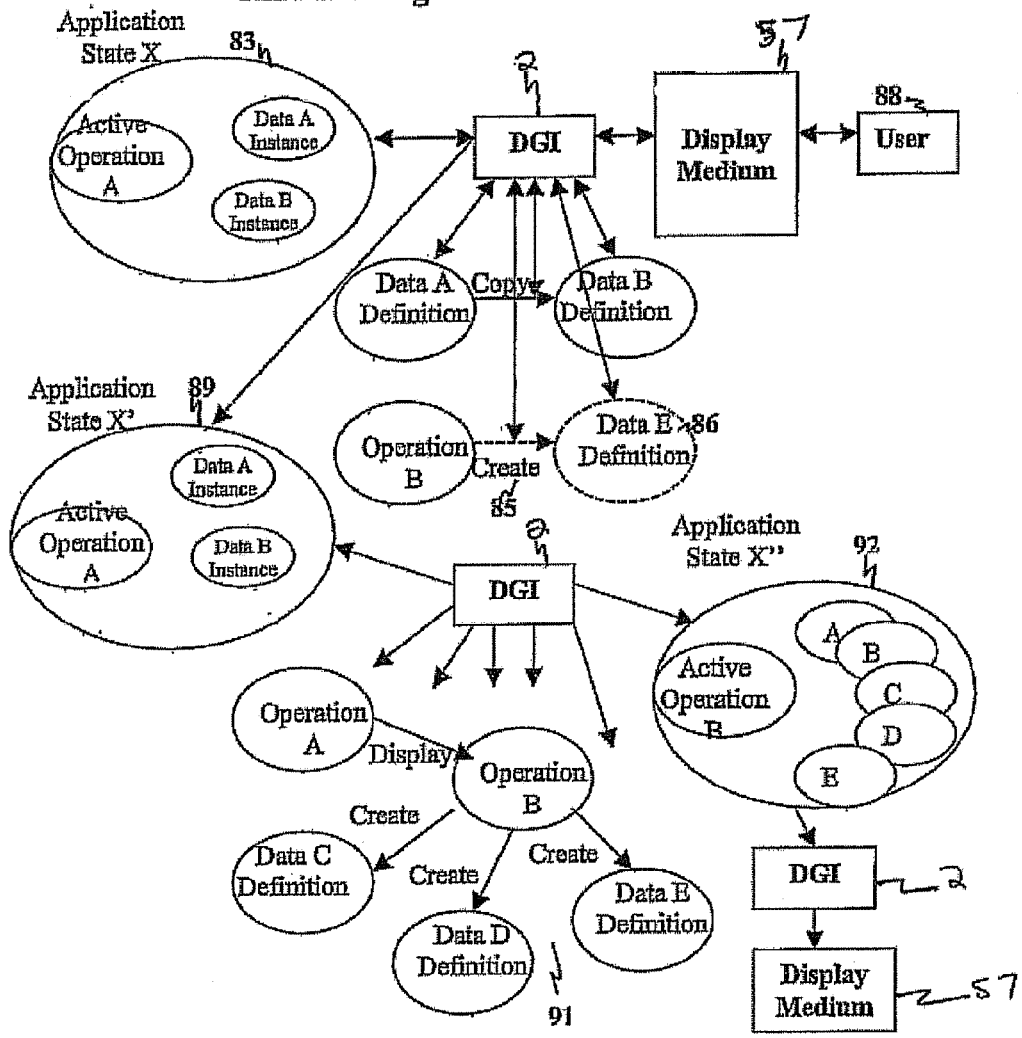
FIG. 19 is Changing an Application State and Adding a Data Definition Node according to embodiments of the present invention.
Figure 20:
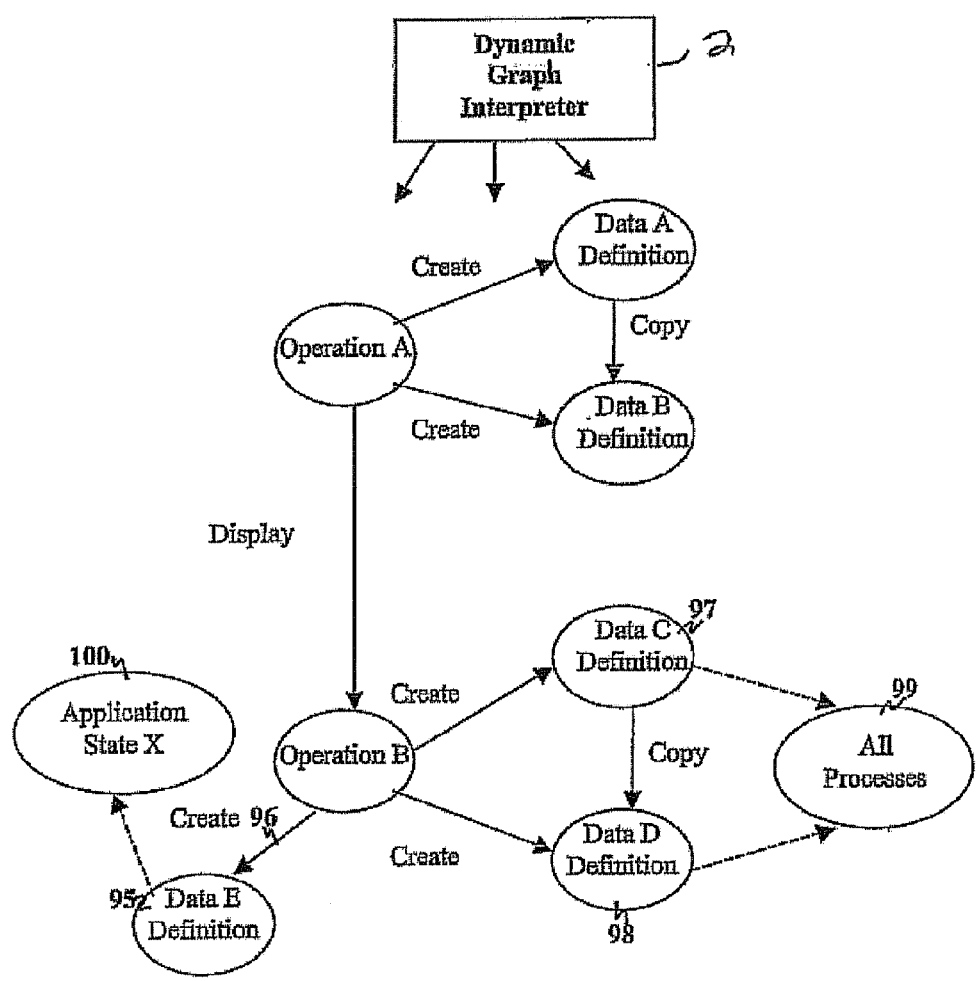
FIG. 20 is Changing an Application State Process and Data Definitions according to embodiments of the present invention.

FIG. 20 outlines the changes to the data definition nodes and edges that result from running the application step as described in FIG. 19. Compare FIGS. 20 and 17. FIG. 20 includes a new data definition node E 95 and a new Create edge 96. Note that as previously discussed in FIG. 4, a particular data definition node or set of properties of a data definition node may be defined for all processes (default), an individual process or set of processes, or a particular application state. So in this example the data definitions C and D are default definitions for all processes 99, while data definition E 95 and Create edge 96 have been defined for application state X 100 only (this also applies to all transformations of X such as X' and X" in this example). This means subsequent runs of the application will access data definitions C 97 and D 98 just as was accessed in application state X; however, data definition E will only be applied to application state X. In the example in FIG. 19 it could have just as easily applied to the new data definition E to all processes instead of just application state X.

The DGI 2 outlined in FIGS. 17-20 allows one to concurrently develop and modify an application while it is being run. In addition it allows such development and modification to apply to all subsequent runs of the application, some subset of subsequent runs or simply to the current instance of the application being run.

OPG and DGI Method and an Embodiment

Following is a description of an exemplary method according to the present invention of creating an OPG 3 system and a DGI 2 system, such systems having been defined and described above. Included is one embodiment of this method.

1.) Choose an initial set of hardware/operating system platforms, programming frameworks, database and/or file systems and display mediums upon which to build and run the OPG 3 and DGI 2 systems. In one embodiment, we use the Linux operating system, running on Intel based server hardware over an Intranet, connected to Intel based PC's running Microsoft Windows XP software and Microsoft Internet Explorer (IE) browsers. The IE browsers running on PC terminals will act as the display medium. We use an object-oriented programming language—Java from Sun Microsystems—to program the OPG 3 and DGI 2 systems. We use a Java Data Objects (JDO) compliant object oriented database system—ObjectDB from ObjectDB Software, Israel—in which to store the persistent data of our OPG 3 system. We use the Jakarta Struts framework and Java Server Pages to render information from the DGI 2 on to our display medium 57. (A Dynamic Graph Interpreter Rendering System will be the subject of a future patent). We use the Jakarta Tomcat application server, running under Linux. The OPG 3 and DGI 2 systems will run on the Tomcat application server. This embodiment may also run, with no programming changes, on the Tomcat application server running locally under the Window XP operating system. Likewise, versions of the ObjectDB database may run either on the server under Linux or locally on a PC under Windows XP. We also use the Eclipse development platform from the Eclipse Foundation along with the MyEclipse plug-in from Genuitec on which to do the Java based software development. Note that the above operating systems, application platforms and programming languages tools represent just one possible embodiment of the present invention.

Figure 2:
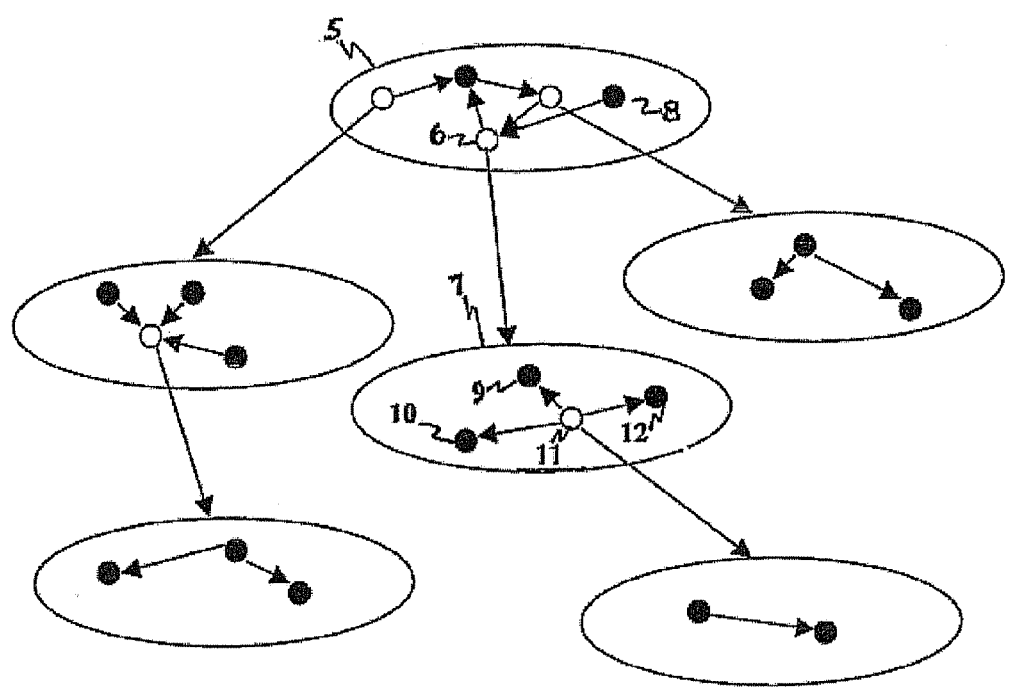
FIG. 2 is a Composite Layered Graph according to embodiments of the present invention.
Figure 4:
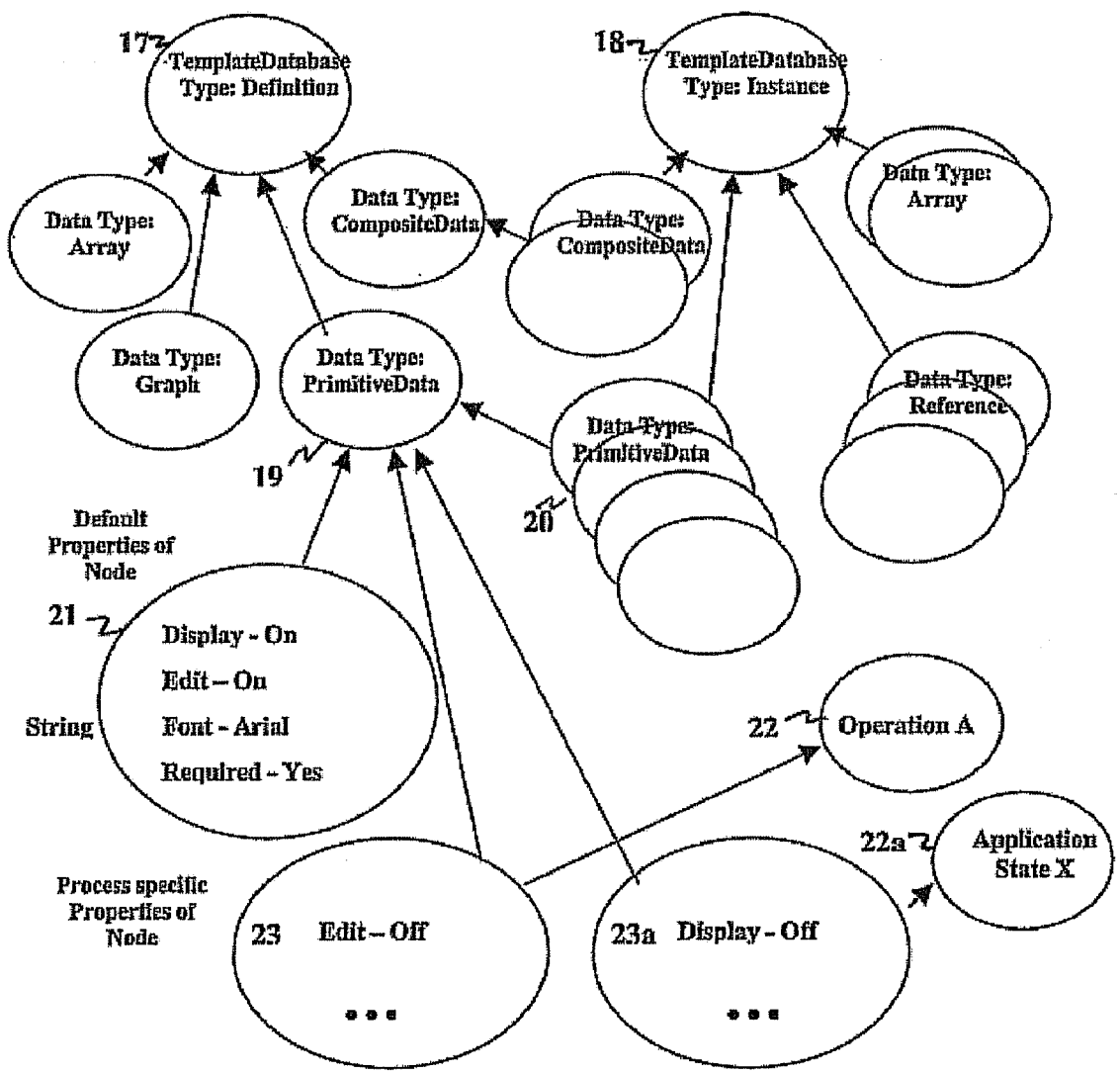
FIG. 4 is Object Process Graph TemplateDatabase Types/Properties according to embodiments of the present invention.
Figure 5:
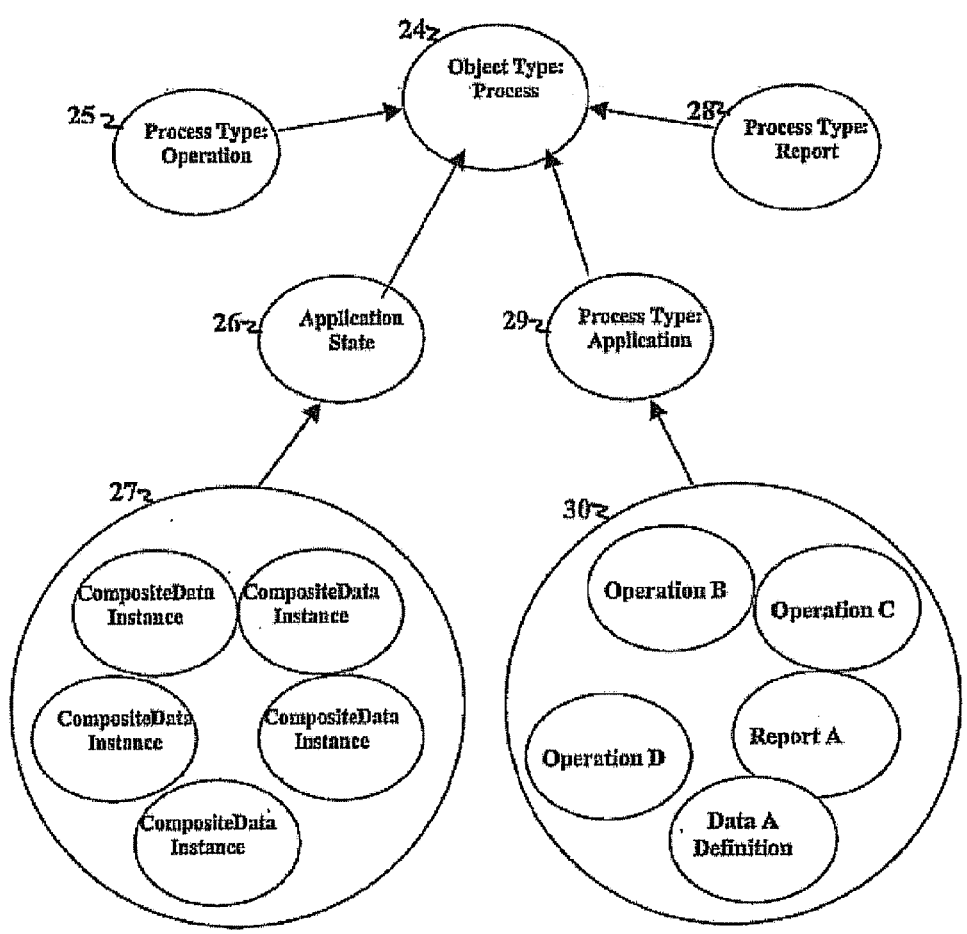
FIG. 5 is Object Process Graph Process Nodes according to embodiments of the present invention.
Figure 12:
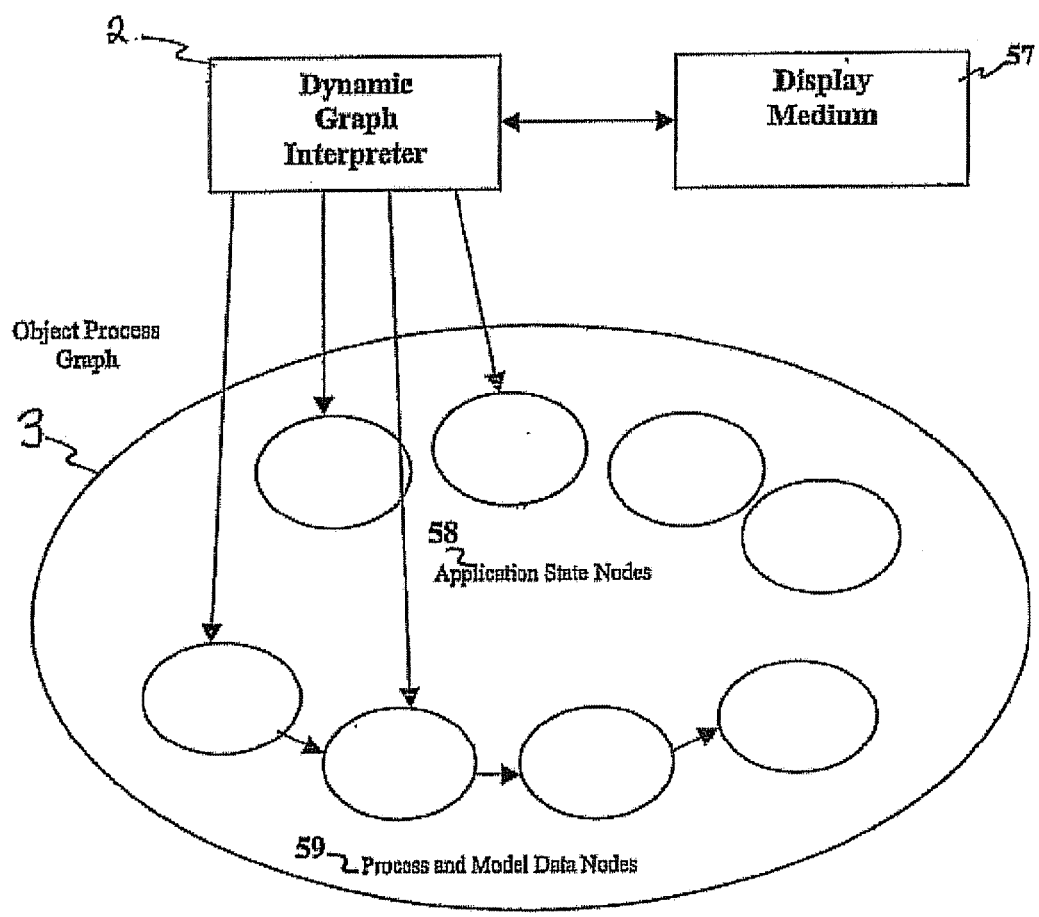
FIG. 12 is a Dynamic Graph Interpreter according to embodiments of the present invention.
Figure 13:
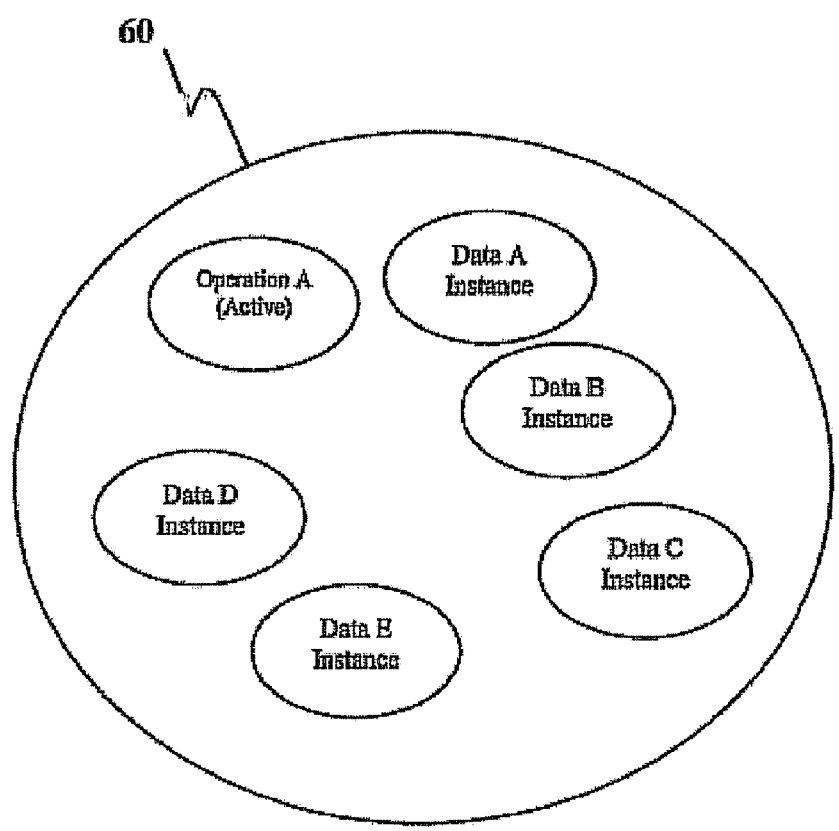
FIG. 13 is an Application State Node according to embodiments of the present invention.
Figure 14:
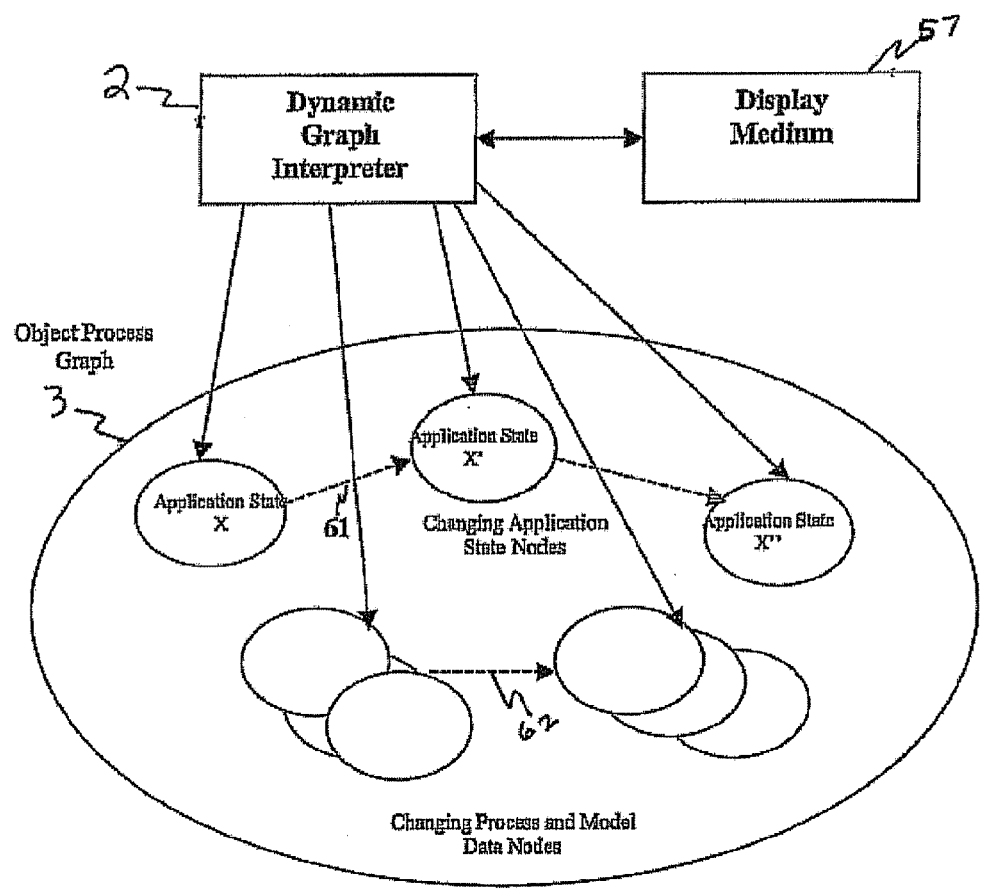
FIG. 14 is a Dynamic Graph Interpreter Running an Application Instance according to embodiments of the present invention.

2.) Using our summary and description of the various embodiments of the present invention above, along with the accompanying FIGS. 1-20, define a set of classes and an appropriate class hierarchy, which will encompass the functionality, required. The design patterns described in "Design Patterns" by Gamma et al, Addison Wesley 1995 and "Patterns in Java" by Grand, Wiley Computer Publishing 1998 may be useful in creating a set of classes with the needed functionality. A high level CASE tool for the definition of these classes may also be used. Some classes that could be defined are:

a. A set of classes to handle the functionality required for creating, modifying, updating and navigating composite layered graphs (FIG. 2). Such classes could be based in part on the Iterator structural pattern (see texts cited above).

b. A set of classes to handle the functionality required for creating, modifying, updating and navigating the various type hierarchies for both data and process nodes (FIGS. 3-5). Such classes could be based in part on the Composite partitioning pattern. Factory method and abstract factory creational patterns may also be useful here and in the other sets of classes following (see texts cited above).

c. A set of classes to handle the various edge types (FIGS. 6-9).

d. A set of classes to handle the user objects (FIG. 10).

e. A set of classes to handle the audit objects (FIG. 11).

f. A set of classes to handle the DGI 2 top level framework (FIGS. 12, 14). Such classes should include functionality to handle event processing and may be partially based on an Observer behavioral pattern (see texts cited above).

g. A set of classes to handle the functionality required for creating, modifying, updating and navigating application states (FIG. 13).

h. A set of classes to display an application state (FIG. 15). This set of classes must interface extensively with the system used for rendering data from the DGI 3 and OPG 2 systems onto a display medium. This Dynamic Graph Interpreter Rendering System, in one embodiment, builds upon the Jakarta Struts framework, using Java Server Pages i. A set of classes for changing an application state (FIGS. 16-20). Such classes should include functionality to handle event processing and may be partially based on an Observer behavioral pattern (see text cited above).

j. A set of classes for changing processes, data definition nodes and edges within the OPG 2 (FIGS. 16-20).

Most of the above classes will need to be defined as persistent, which will allow the associated attributes defined within them to be saved to a long term persistent medium such as a storage medium. If a JDO compliant database is used, such as ObjectDB, this may be done with minimal extra programming—all that would be required is an XML file detailing, which classes are persistent. The classes in the Dynamic Graph Interpreter Rendering System, which interact with the DGI and the display medium, will not generally be persistent.

Although the present invention has been described in considerable detail with reference to certain embodiments, other embodiments are possible. For example, different operating systems, programming languages, and software architectures may be used to practice embodiments of the present invention. Therefore, the spirit and scope of the appended claims should not be limited to the description of the embodiments contained herein.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer implemented object process graph system for creating and executing application programs, the object process graph system comprising:
   a graph structure stored in a computer-readable medium for defining an application, said graph structure including process and control elements for control over an order and a timing of data validation, transformation and display, said graph structure being dynamic, directed and cyclical, and said graph structure including at least one data node, at least one process node, and at least one application state node; and
   an interpreter for interpreting said graph structure to process and execute said application, wherein said interpreter acts on said graph structure by changing application state information held in said at least one application state node, said application state information including one or more transient data objects and persistent data objects; and
   wherein said graph structure is capable of being changed via a user interface, while said graph structure is being interpreted by said interpreter.

2. The system of claim 1, wherein said graph structure includes at least one relational edge for defining a relationship between at least two nodes in said graph structure.

3. The system of claim 1, wherein said graph structure includes at least one transformational edge for defining a transforming relationship between at least two nodes in said graph structure.

4. The system of claim 1, wherein said graph structure includes at least one edge for defining a relationship between at least two nodes in said graph structure.

5. The system of claim 1, wherein said graph structure is further capable of being changed in response to external input data, while said graph structure is being interpreted by said interpreter.

6. The system of claim 1, wherein said graph structure includes data for said application.

7. The system of claim 6, wherein said data includes a data structure selected from the following data structures: relational tables, hierarchical tables, n-dimensional data arrays, spreadsheets, graphical models, and 3-d physical models.

8. The system of claim 6, wherein said graph structure includes validation for said data.

9. The system of claim 1, wherein said graph structure includes processing logic and data flow for said application.

10. The system of claim 1, further comprising:
    the user interface for displaying at least a portion of said graph structure;
    wherein said graph structure defines display characteristics for said portion.

11. The system of claim 10, wherein said user interface is further utilized for creating and editing said graph structure.

12. The system of claim 1, further comprising:
    a persistent medium for storing said graph structure and said interpreter.

13. The system of claim 1, wherein said interpreter operates on a plurality of application states concurrently.

14. The system of claim 1, wherein said interpreter operates by merging or splitting application state information between a combination of application state objects.

15. The system of claim 1, further comprising:
    audit information defining changes made in a transaction;
    wherein the changes are capable of being partly or wholly rolled back.

16. A computer implemented object process graph system for creating and executing application programs, the object process graph system comprising:
    a graph structure for defining an application, said graph structure being a composite layered graph including process and control elements for control over an order and a timing of data validation, transformation and display, and said graph structure including a plurality of nodes and edges, each node having a node type of either composite or primitive;
    a display medium for providing a user interface, said user interface being capable of receiving a change to said graph structure;
    an interpreter for interpreting said graph structure to process and execute said application, wherein said interpreter interprets said graph structure to process said application by performing method of:
        accessing state nodes, process nodes, and data nodes in said graph structure;
        transitioning from a first application state to a second application state in said graph structure;
        displaying state information on said display medium;
        receiving user input; and
        changing an aspect of said graph structure based on said user input; and
    wherein said graph structure is capable of being changed, while said graph structure is being interpreted by said interpreter.

17. The system of claim 16, wherein each node belongs to both a directed graph and a tree, said directed graph defining a relationship to other nodes within said graph structure, said tree defining a composition hierarchy.

18. The system of claim 16, wherein said nodes are instances of objects.

19. The system of claim 18, wherein each object has an object type of: a process type or a data type, said process type being operation, report, or application, said data type being primitive data, composite data, array, graph, or reference.

20. The system of claim 19, wherein each node being an instance of an object having object type of data type has a duration property, said duration property defining a lifetime of said node.

21. The system of claim 19, wherein each node being an instance of an object having object type of process type is capable of controlling a flow of nodes through said application and creating, modifying, and displaying nodes via said display medium.

22. The system of claim 19, wherein each node being an instance of an object having object type of operation represents at least one step in a flow of nodes though said application.

23. The system of claim 19, wherein each node being an instance of an object having object type of application is created, modified, or displayed though operation nodes.

24. The system of claim 16, wherein each node has a template database type of either definition or instance.

25. The system of claim 16, wherein said graph structure includes at least one edge to define relationships between nodes.

26. The system of claim 16, further comprising at least one user object for controlling access to functionality and data of said application.

27. The system of claim 26, wherein said user object includes a plurality of objects, each object having an associated access right.

28. The system of claim 27, wherein said access right includes rollback, read, and write.

29. The system of claim 16, wherein said interpreter is capable of dynamically displaying visual aspects of said application.

30. The system of claim 16, wherein transitioning from said first application state to said second application state is performed by:
  determining an active operation node in said first application state;
  finding any first edges leading out from said active operation node and executing first transformations associated with said first edges;
  determining data definition nodes corresponding to data instances in said first application state;
  finding any second edges leading out from said data definition nodes; and executing second transformations associated with said second edges.

31. A computer implemented object process graph system for creating and executing application programs, the object process graph system comprising:
  a graph structure stored in a computer-readable medium for defining an application, said graph structure being dynamic, directed and cyclical, said graph structure including:
    at least one data node;
    at least one process node;
    at least one application state node;
    at least one relational edge for defining a relationship between at least two nodes in said graph structure;
    at least one transformational edge for defining a transforming relationship between at least two nodes in said graph structure;
    data for said application;
    validation for said data;
    process and control elements for control over an order and a timing of data validation, transformation, and display; and
  an interpreter for interpreting said graph structure to process and execute said application, wherein said interpreter acts on said graph structure by changing application state information held in said graph structure, said application state information including one or more transient data objects and persistent data objects; and
  wherein said graph structure is capable of being changed via a user interface while said graph structure is being interpreted by said interpreter.

32. The system of claim 31, wherein said graph structure is further cap able of being changed in response to external input data, while said graph structure is being interpreted by said interpreter.

33. The system of claim 31, wherein said data includes a data structure selected from the following data structures: relational tables, hierarchical tables, n-dimensional data arrays, spreadsheets, graphical models, and 3-d physical models.

34. The system of claim 31, wherein said graph structure includes processing logic and data flow for said application.

35. The system of claim 31, further comprising:
  the user interface for displaying at least a portion of said graph structure;
  wherein said graph structure defines display characteristics for said portion.

36. The system of claim 35, wherein said user interface is further utilized for creating and editing said graph structure.

37. The system of claim 31, further comprising:
  a persistent medium for storing said graph structure and said interpreter.

38. The system of claim 31, wherein said interpreter operates on a plurality of application states concurrently.

39. The system of claim 31, wherein said interpreter operates by merging or splitting application state information between a combination of application state objects.

40. The system of claim 31, further comprising:
  audit information defining changes made in a transaction;
  wherein the changes are capable of being partly or wholly rolled back.

41. A computer implemented object process graph system for creating and executing application programs, the object process graph system comprising:
  a graph structure stored in a computer-readable medium for defining an application, said graph structure being dynamic, directed and cyclical, and said graph structure including:
    at least one data node;
    at least one process node;
    at least one application state node;
    data for said application; and
    validation for said data, including timing of said validation; and
  an interpreter for interpreting said graph structure to process and execute said application;
  wherein said graph structure is capable of being changed via a user interface, while said graph structure is being interpreted by said interpreter.

42. A computer implemented object process graph system for creating and executing application programs, the object process graph system comprising:
  a graph structure stored in a computer-readable medium for defining an application including process and control elements for control over an order and a timing of data validation, transformation and display, said graph structure being dynamic, directed and cyclical, and said graph structure including at least one data node, at least one process node, and at least one application state node; and
  an interpreter for interpreting said graph structure to process and execute said application, said interpreter operating by merging or splitting application state information between a combination of application state objects;
  wherein said graph structure is capable of being changed via a user interface, while said graph structure is being interpreted by said interpreter.

43. A computer implemented object process graph system for creating and executing application programs, the object process graph system comprising:
  a graph structure for defining an application, said graph structure being a composite layered graph, and said graph structure including a plurality of nodes and edges, each node having a node type of either composite or primitive;

an interpreter for interpreting said graph structure to process and execute said application; and a display medium for providing a user interface, said user interface being capable of receiving a change to said graph structure;

wherein said graph structure is capable of being changed, while said graph structure is being interpreted by said interpreter, said graph structure includes at least one edge to define relationships between nodes, and each edge has an edge type of: processToProcess, processToData, or dataToData.

44. The system of claim 43, wherein each said edge type of process-to-process has a subtype of display, queue, or batch.

45. The system of claim 43, wherein each said edge type of data-to-data has a subtype of copy, compute, split, merge, or join.

46. The system of claim 43, wherein each said edge type of process-to-data has a subtype of create, retrieve, or execute.

47. A computer implemented object process graph system for creating and executing application programs, the object process graph system comprising:

a graph structure for defining an application, said graph structure being a composite layered graph including process and control elements for control over an order and a timing of data validation, transformation and display, and said graph structure including a plurality of nodes and edges, each node having a node type of either composite or primitive;

an interpreter for interpreting said graph structure to process and execute said application;

at least one user object for controlling access to functionality and data of said application, wherein one of said objects is of type audit; and a display medium for providing a user interface, said user interface being capable of receiving a change to said graph structure;

wherein said graph structure is capable of being changed, while said graph structure is being interpreted by said interpreter.

* * * * *